US010239351B2

United States Patent
Oba et al.

(10) Patent No.: US 10,239,351 B2
(45) Date of Patent: Mar. 26, 2019

(54) PNEUMATIC TIRE

(71) Applicant: SUMITOMO RUBBER INDUSTRIES, LTD., Kobe-shi, Hyogo (JP)

(72) Inventors: Ryo Oba, Kobe (JP); Daisuke Utsumi, Kobe (JP); Norio Hayashi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 946 days.

(21) Appl. No.: 14/375,033

(22) PCT Filed: Oct. 25, 2012

(86) PCT No.: PCT/JP2012/077530
§ 371 (c)(1),
(2) Date: Jul. 28, 2014

(87) PCT Pub. No.: WO2013/125095
PCT Pub. Date: Aug. 29, 2013

(65) Prior Publication Data
US 2015/0007916 A1 Jan. 8, 2015

(30) Foreign Application Priority Data

Feb. 21, 2012 (JP) ................... 2012-034817

(51) Int. Cl.
B60C 11/00 (2006.01)
B60C 11/01 (2006.01)
B60C 13/04 (2006.01)

(52) U.S. Cl.
CPC ........ B60C 11/005 (2013.01); B60C 11/0008 (2013.01); *B60C 2011/0025* (2013.01);
(Continued)

(58) Field of Classification Search
CPC . B60C 11/041; B60C 11/005; B60C 11/0058; B60C 11/0075; B60C 11/0066;
(Continued)

(56) References Cited

U.S. PATENT DOCUMENTS 4,273,177 A * 6/1981 Nybakken ............. B29D 30/08
152/209.5
5,174,838 A * 12/1992 Sandstrom ............ B60C 1/0016
152/209.5
(Continued)

FOREIGN PATENT DOCUMENTS

JP 7-52609 A 2/1995
JP 11-301209 A 11/1999
(Continued)

OTHER PUBLICATIONS

Machine Translation: JP 2006062518 A; Maruoka, Kiyoto; no date.*
Machine Translation: JP-2003312210-A; Ito, Kuniaki; no date.*

*Primary Examiner* — Kendra Ly
(74) *Attorney, Agent, or Firm* — Birch,m Stewart, Kolasch & Birch, LLP

(57) ABSTRACT

[Object] A pneumatic tire 2 which is excellent in durability is provided.
[Solution] The tire 2 includes adhesive sheet layers 28. Each adhesive sheet layer 28 includes an interposed portion 58 and a protruding portion 60. The interposed portion 58 is interposed between a base layer 32 and a cap layer 34 of a tread 4. The protruding portion 60 is layered over a carcass 12. The adhesive sheet layers 28 are obtained by a rubber composition being crosslinked. The rubber composition contains a tackifier. A width W1 of the interposed portion 58 is preferably greater than or equal to 5 mm, and preferably not greater than 20 mm. A width W2 of the protruding portion 60 is preferably greater than or equal to 10 mm, and
(Continued)

preferably not greater than 20 mm. A thickness of each adhesive sheet layer 28 is preferably greater than or equal to 0.5 mm, and preferably not greater than 2.0 mm. A ratio of an adhesive strength of each adhesive sheet layer 28 to an adhesive strength of the cap layer 34 is preferably greater than or equal to 1.30.

13 Claims, 3 Drawing Sheets

(52) U.S. Cl.
CPC ............ *B60C 2011/0033* (2013.01); *B60C 2011/0091* (2013.01); *B60C 2011/016* (2013.01); *B60C 2013/045* (2013.01)

(58) Field of Classification Search
CPC .......... B60C 11/0041; B60C 9/1835; B60C 2009/1857; B60C 2009/1864; B60C 2009/1871; B60C 2009/1878; B60C 2013/045

USPC .......................................... 152/209.5, DIG. 2
See application file for complete search history.

(56) References Cited

U.S. PATENT DOCUMENTS

| | | | |
|---|---|---|---|
| 2002/0074077 A1 | 6/2002 | Ikeda et al. | |
| 2011/0000594 A1 | 1/2011 | Shima | |
| 2012/0118462 A1* | 5/2012 | Segawa | B60C 11/00 152/450 |
| 2013/0068358 A1* | 3/2013 | Shinkai | B60C 19/082 152/152.1 |

FOREIGN PATENT DOCUMENTS

| | | | | |
|---|---|---|---|---|
| JP | 2001-80314 A | | 3/2001 | |
| JP | 2002-160508 A | | 6/2002 | |
| JP | 2003312210 A | * | 11/2003 | |
| JP | 2004-168113 A | | 6/2004 | |
| JP | 2006062518 A | * | 3/2006 | B29D 30/3028 |

* cited by examiner

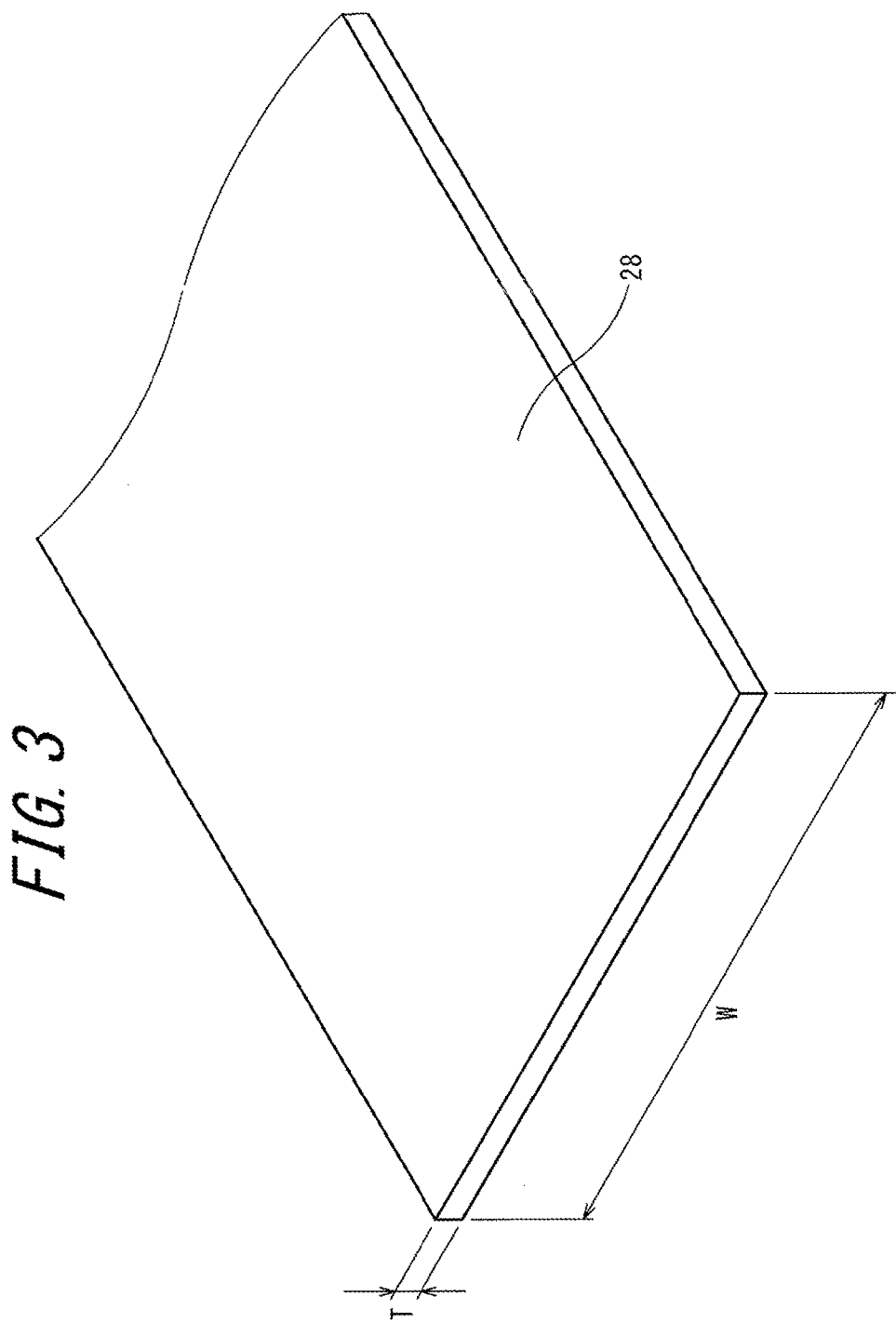

PNEUMATIC TIRE

TECHNICAL FIELD

The present invention relates to pneumatic tires. More specifically, the present invention relates to tires in which a tread includes a base layer and a cap layer.

BACKGROUND ART

A tread typically includes a base layer and a cap layer. The base layer is formed of a crosslinked rubber which is excellent in adhesiveness. The cap layer is formed of a crosslinked rubber which is excellent in abrasion resistance. As a method for forming the base layer and the cap layer, a strip-wind method is known. In the strip-wind method, a first strip that is formed of an uncrosslinked rubber and ribbon-shaped is helically wound to form a winding for the base layer. Over this winding, a second strip that is formed of another uncrosslinked rubber and ribbon-shaped is helically wound, to form a winding for the cap layer. The winding for the cap layer is joined to and integrated with the winding for the base layer due to adhesiveness of the uncrosslinked rubber. The strip-wind method is disclosed in JP2002-160508.

CITATION LIST

Patent Literature

Patent Literature 1: JP2002-160508

SUMMARY OF THE INVENTION

Problems to be Solved by the Invention

When the second strip is wound, the second strip may not be sufficiently jointed to the winding for the base layer in some cases. The insufficient joining is likely to occur near ends of a tread. When the joining is insufficient, air may remain between both the windings. A raw cover including the tread is discarded.

When a raw cover is formed, end portions of a tread may be layered over a carcass. Air may remain also between the end portions and the carcass due to poor joining. The raw cover in which air remains is discarded.

In recent years, tires having good low fuel consumption performance are in high demand. For this tire, a cap layer that enables reduction of rolling resistance is used. An adhesiveness index of the cap layer is low. When a raw cover including the cap layer is formed, joining is likely to become poor in particular.

An object of the present invention is to provide a pneumatic tire in which joining between components is less likely to become poor in a forming process.

Solution to the Problems

A pneumatic tire of the present invention includes:
(1) a tread including a base layer, and a cap layer that is disposed outward of the base layer in a radial direction and is layered over the base layer;
(2) a pair of sidewalls that extend almost inward from ends, respectively, of the tread in the radial direction;
(3) a pair of beads that are disposed almost inward of the sidewalls, respectively, in the radial direction;
(4) a carcass that is extended, along the tread and the sidewalls, on and between both the beads; and
(5) a pair of adhesive sheet layers disposed such that a portion of each adhesive sheet layer is interposed between the base layer and the cap layer, and a remaining portion of each adhesive sheet layer is layered over the carcass in a region inward of each sidewall in an axial direction.

Preferably, a width of the portion of each adhesive sheet layer interposed between the base layer and the cap layer is greater than or equal to 5 mm, and not greater than 20 mm. Preferably, a width of the portion of each adhesive sheet layer which is layered over the carcass is greater than or equal to 10 mm, and not greater than 20 mm.

Preferably, a thickness of each adhesive sheet layer is greater than or equal to 0.5 mm, and not greater than 2.0 mm.

Preferably, a ratio of an adhesive strength of each adhesive sheet layer to an adhesive strength of the cap layer is greater than or equal to 1.30.

Preferably, a loss tangent tan δ is less than or equal to 0.30, and a complex elastic modulus E* is greater than or equal to 10.5 in the cap layer. The loss tangent tan δ and the complex elastic modulus E* are measured under conditions that an initial strain is 10%, a dynamic strain is ±2%, a frequency is 10 Hz, a deformation mode is tension, and a temperature is 30° C.

Advantageous Effects of the Invention

In the pneumatic tire according to the present invention, the base layer and the cap layer are firmly joined to each other due to the adhesive sheet layers. Further, in the tire, the tread and the carcass can be firmly joined to each other due to the adhesive sheet layers.

BRIEF DESCRIPTION OF THE DRAWINGS

FIG. 3 is a perspective view of an adhesive sheet layer of the tire shown in FIG. 1.

DESCRIPTION OF EMBODIMENTS

The following will describe in detail the present invention based on preferred embodiments with reference where appropriate to the drawings.

Figure 1:
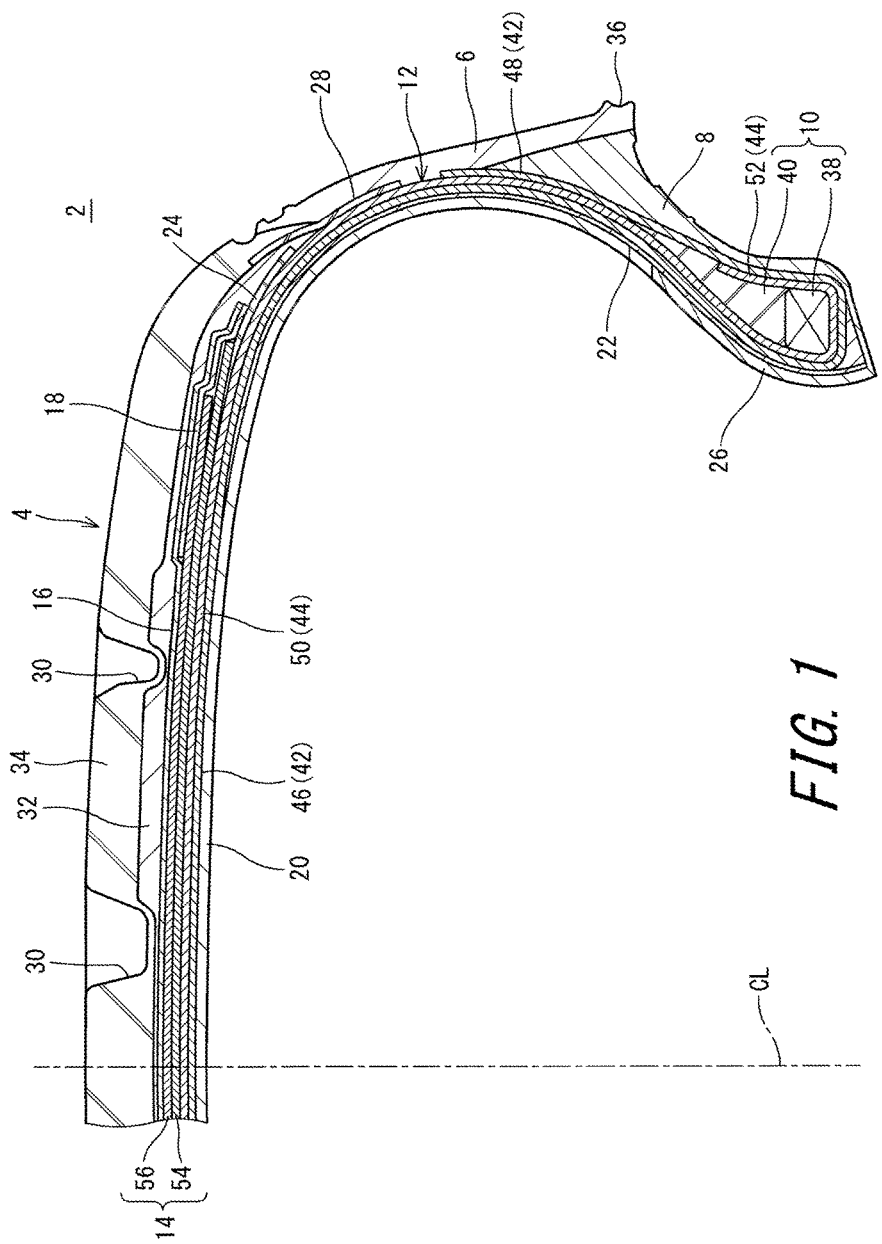
FIG. 1 is a cross-sectional view of a portion of a pneumatic tire according to one embodiment of the present invention.

FIG. 1 shows a pneumatic tire 2. In FIG. 1, the upward/downward direction represents the radial direction of the tire 2, the leftward/rightward direction represents the axial direction of the tire 2, and the direction orthogonal to the surface of the sheet represents the circumferential direction of the tire 2. In FIG. 1, an alternate long and short dash line CL represents the equator plane of the tire 2. The tire 2 has a shape which is symmetric about the equator plane except for a pattern of a tread 4.

The tire 2 includes the tread 4, sidewalls 6, clinch portions 8, beads 10, a carcass 12, a belt 14, a band 16, edge bands 18, an inner liner 20, insulations 22, cushion layers 24, chafers 26, and adhesive sheet layers 28. The tire 2 is of a tubeless type. The tire 2 of the present embodiment is mounted to passenger cars.

The tread 4 has a shape that projects outward in the radial direction. The tread 4 forms a tread surface that can contact with a road surface. The tread surface has grooves 30. A tread pattern is formed by the grooves 30. The tread 4 includes a base layer 32 and a cap layer 34. The cap layer 34 is disposed outward of the base layer 32 in the radial direction. The cap layer 34 is layered over the base layer 32. The base layer 32 is formed of a crosslinked rubber which is excellent in adhesiveness. A typical base rubber of the base layer 32 is a natural rubber. The cap layer 34 is formed of a crosslinked rubber which is excellent in abrasion resistance, heat resistance, and grip performance.

The sidewalls 6 extend almost inward in the radial direction from ends of the tread 4. The outer side ends, in the radial direction, of the sidewalls 6 are jointed to the tread 4. In the joining portion, the sidewalls 6 are disposed outward of the tread 4 in the axial direction. The tire 2 has an SOT structure (sidewall-over-tread structure). The inner side ends, in the radial direction, of the sidewalls 6 are jointed to the clinch portions 8. The sidewalls 6 are formed of a crosslinked rubber which is excellent in cut resistance and light resistance. The sidewalls 6 prevent damage of the carcass 12. The sidewalls 6 include ribs 36. The ribs 36 project outward in the axial direction. The ribs 36 prevent damage of a flange of a rim to which the tire 2 is mounted.

The clinch portions 8 are disposed almost inward of the sidewalls 6 in the radial direction. The clinch portions 8 are disposed outward of the beads 10 and the carcass 12 in the axial direction. The clinch portions 8 are formed of a crosslinked rubber which is excellent in abrasion resistance. The clinch portions 8 contact with a flange of a rim.

The beads 10 are disposed inward of the sidewalls 6 in the radial direction. Each bead 10 includes a core 38 and an apex 40 that extends outward from the core 38 in the radial direction. The core 38 is ring-shaped, and includes a non-stretchable wound wire. A typical material of the wire is a steel. The apex 40 is tapered outward in the radial direction. The apex 40 is formed of a highly hard crosslinked rubber.

The carcass 12 includes a first carcass ply 42 and a second carcass ply 44. The first carcass ply 42 and the second carcass ply 44 are each extended, along the tread 4 and the sidewalls 6, on and between the beads 10 on both sides. The first carcass ply 42 is turned up around the core 38 from the inner side toward the outer side in the axial direction. Due to this turning-up, the first carcass ply 42 includes a main portion 46 and turned-up portions 48. The second carcass ply 44 is turned up around the core 38 from the inner side toward the outer side in the axial direction. Due to this turning-up, the second carcass ply 44 includes a main portion 50 and turned-up portions 52. Ends of the turned-up portions of the first carcass ply 42 are disposed outward of ends of the turned-up portions of the second carcass ply 44 in the radial direction.

Each of the carcass plies 42, 44 includes multiple cords aligned with each other and a topping rubber, which are not shown. An absolute value of an angle of each cord relative to the equator plane ranges from 45° to 90°, and more preferably ranges from 75° to 90°. In other words, the carcass 12 forms a radial structure. The cords are formed of an organic fiber. Examples of preferable organic fiber include polyester fibers, nylon fibers, rayon fibers, polyethylene naphthalate fibers, and aramid fibers. The carcass 12 may be formed of one carcass ply.

The belt 14 is disposed outward of the carcass 12 in the radial direction. The belt 14 is layered over the carcass 12. The belt 14 reinforces the carcass 12. The belt 14 includes an inner layer 54 and an outer layer 56. As is apparent from FIG. 1, the width, in the axial direction, of the inner layer 54 is slightly greater than the width, in the axial direction, of the outer layer 56. Each of the inner layer 54 and the outer layer 56 includes multiple cords aligned with each other and a topping rubber, which are not shown. Each cord is tilted relative to the equator plane. An absolute value of the tilt angle is typically greater than or equal to 10°, and not greater than 35°. A direction in which the cords of the inner layer 54 are tilted relative to the equator plane is opposite to a direction in which the cords of the outer layer 56 are tilted relative to the equator plane. A preferable material of the cords is a steel. An organic fiber may be used for the cords. The width, in the axial direction, of the belt 14 is preferably greater than or equal to 0.7 times the maximum width of the tire 2. The belt 14 may include three or more layers.

The band 16 is disposed outward of the belt 14 in the radial direction. The width, in the axial direction, of the band 16 is greater than the width, in the axial direction, of the belt 14. The band 16 includes a cord and a topping rubber, which are not shown. The cord is helically wound. The band 16 has a so-called jointless structure. The cord extends substantially in the circumferential direction. An angle of the cord relative to the circumferential direction is less than or equal to 5°, and more preferably less than or equal to 2°. The belt 14 is held by the cord, to reduce lifting of the belt 14. The cord is formed of an organic fiber. Examples of preferable organic fiber include nylon fibers, polyester fibers, rayon fibers, polyethylene naphthalate fibers, and aramid fibers.

The belt 14 and the band 16 form a reinforcing layer. The reinforcing layer may be formed merely by the belt 14. The reinforcing layer may be formed merely by the band 16.

The edge bands 18 are disposed outward of the belt 14 in the radial direction near ends of the belt 14. Each edge band 18 includes a cord and a topping rubber, which are not shown. The cord is helically wound. Each edge band 18 has a so-called jointless structure. The cord extends substantially in the circumferential direction. An angle of the cord relative to the circumferential direction is less than or equal to 5°, and more preferably less than or equal to 2°. The ends of the belt 14 are held by the cords, to reduce lifting of the belt 14. The cord is formed of an organic fiber. Examples of preferable organic fiber include nylon fibers, polyester fibers, rayon fibers, polyethylene naphthalate fibers, and aramid fibers.

The inner liner 20 is jointed to an inner circumferential surface of the carcass 12 near the equator plane CL. The inner liner 20 is formed of a crosslinked rubber. A rubber which is excellent in air tightness is used for the inner liner 20. A typical base rubber of the inner liner 20 is isobutylene-isoprene-rubber or halogenated isobutylene-isoprene-rubber. The inner liner 20 maintains the internal pressure of the tire 2.

The insulations 22 are disposed inward of the sidewalls 6 in the axial direction. The insulations 22 are interposed between the carcass 12 and the inner liner 20. The insulations 22 are formed of a crosslinked rubber which is excellent in adhesiveness. The insulations 22 are firmly joined to the carcass 12 and firmly joined also to the inner liner 20. Due to the insulations 22, separation of the inner liner 20 from the carcass 12 in a region inward of the sidewalls 6 in the axial direction is less likely to occur.

The cushion layers 24 are layered over the carcass 12 near the ends of the belt 14. The cushion layers 24 are formed of a soft crosslinked rubber. The cushion layers 24 absorb stress on the ends of the belt 14. Due to the cushion layers 24, lifting of the belt 14 is less likely to occur.

The chafers 26 are disposed near the beads 10. When the tire 2 is mounted to a rim, the chafers 26 contact with the rim. Due to this contact, portions near the beads 10 are protected. In the present embodiment, the chafers 26 are integrated with the clinch portions 8. Therefore, a material of the chafers 26 is the same as a material of the clinch portions 8. The chafers 26 may be formed of a fabric and a rubber impregnated into the fabric.

Figure 2:
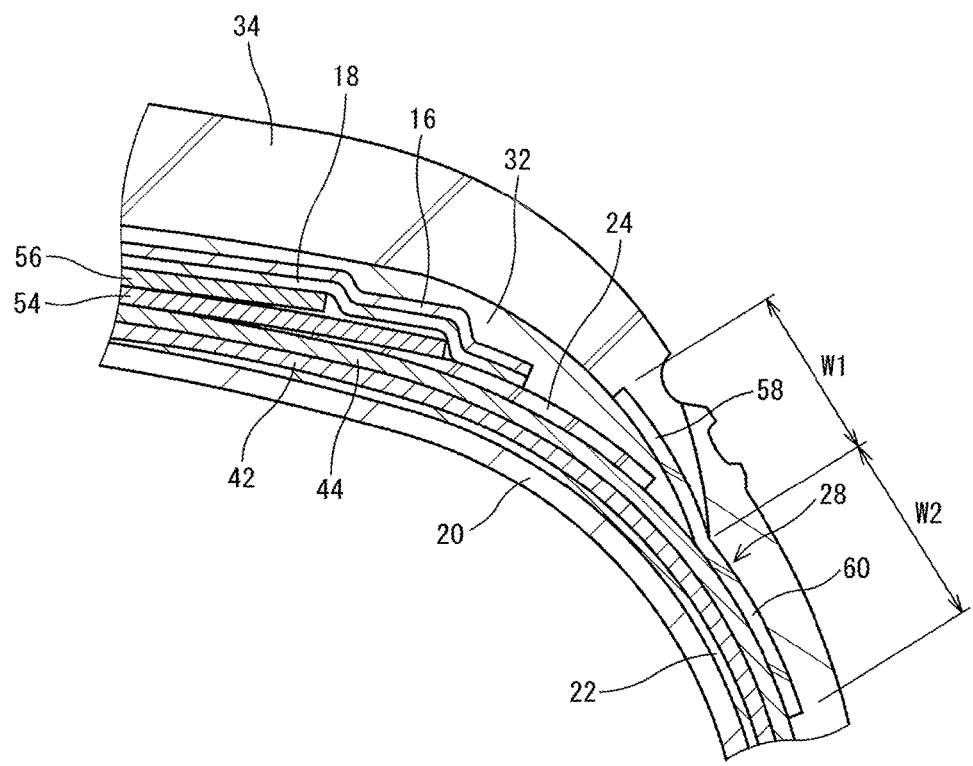
FIG. 2 is an enlarged cross-sectional view of a portion of the tire shown in FIG. 1.

As shown in FIG. 2, a portion of each adhesive sheet layer 28 is interposed between the base layer 32 and the cap layer 34. Hereinafter, this portion is referred to as an interposed portion 58. A portion, other than the interposed portion 58, of each adhesive sheet layer 28 is layered over the carcass 12. Hereinafter, this portion is referred to as a protruding portion 60.

The adhesive sheet layers 28 are obtained by a rubber composition being crosslinked. The rubber composition (uncrosslinked) is excellent in adhesiveness. Since the rubber composition is excellent in adhesiveness, when a raw cover is formed, the base layer 32 and the cap layer 34 are sufficiently joined to each other through the interposed portions 58. The interposed portions 58 serve to reduce remaining air between the base layer 32 and the cap layer 34. When the raw cover is formed, the tread 4 and the carcass 12 are sufficiently joined to each other through the protruding portions 60. The protruding portions 60 serve to reduce remaining air between the tread 4 and the carcass 12. In the manufacturing of the tire 2, a fraction defective is low in raw cover.

In the tire 2 including the adhesive sheet layers 28, even when, in the cap layer 34, a loss tangent tan δ is less than or equal to 0.30 and a complex elastic modulus E* is higher than or equal to 10.5, remaining air is reduced. The cap layer 34 in which the loss tangent tan δ is less than or equal to 0.30 and the complex elastic modulus E* is higher than or equal to 10.5, can contribute to low fuel consumption of the tire 2. The loss tangent tan δ and the complex elastic modulus E* are measured in compliance with the standard of "JIS K 6394". The conditions for the measurement are as follows.

Viscoelasticity spectrometer: "VESF-3" manufactured by Iwamoto Seisakusho
Initial strain: 10%
Dynamic strain: ±2%
Frequency: 10 Hz
Deformation mode: tension
Measurement temperature: 30° C.

Since the rubber composition of the adhesive sheet layers 28 contains a tackifier, adhesiveness of the adhesive sheet layers 28 can be enhanced. In the viewpoint of the adhesiveness, an amount of the tackifier with respect to 100 parts by mass of the base rubber is preferably greater than or equal to 1 part by mass, and particularly preferably greater than or equal to 5 parts by mass. This amount is preferably not greater than 10 parts by mass.

An example of a preferable composition of the adhesive sheet layers 28 is indicated below.
natural rubber: 40 parts by mass
polybutadiene: 60 parts by mass
carbon black: 50 parts by mass
tackifier: 5 parts by mass
mineral oil: 10 parts by mass
anti-aging agent: 3 parts by mass
wax: 2 parts by mass
stearic acid: 3 parts by mass
zinc oxide: 3 parts by mass
sulfur: 2 parts by mass
vulcanization accelerator NS: 1.5 parts by mass In the viewpoint of reduction of remaining air, a ratio of an adhesive strength of the adhesive sheet layer 28 to an adhesive strength of the cap layer 34 is preferably greater than or equal to 1.30, more preferably greater than or equal to 1.50, and particularly preferably greater than or equal to 1.75. The ratio is preferably not greater than 2.5.

The adhesive strength is measured by trade name "PICMA tack tester" manufactured by Toyo Seiki Seisakusho, Ltd. The measurement conditions are as follows.
Ascending speed: 30 mm/min
Measurement time: 2.5 seconds
Temperature: 23° C.
Humidity: 55%

A Mooney viscosity ($ML_{1+4}$ (100° C.)) of the rubber composition of the adhesive sheet layers 28 is preferably higher than or equal to 45. The rubber composition having a Mooney viscosity that is higher than or equal to 45 enables reduction of remaining air. In this viewpoint, the Mooney viscosity is particularly preferably higher than or equal to 60. The Mooney viscosity is preferably not higher than 80.

A ratio of an adhesive strength of the base layer 32 to an adhesive strength of the cap layer 34 is preferably greater than or equal to 1.10, and preferably not greater than 1.80. A ratio of an adhesive strength of the topping rubber of the carcass 12 to an adhesive strength of the cap layer 34 is preferably greater than or equal to 1.10, and preferably not greater than 1.65.

A width of each interposed portion 58 is indicated by an arrow W1 in FIG. 2. A width W1 is preferably greater than or equal to 5 mm, and preferably not greater than 20 mm. The interposed portions 58 each having the width W1 that is greater than or equal to 5 mm enable reduction of remaining air between the base layer 32 and the cap layer 34. In this viewpoint, the width W1 is particularly preferably greater than or equal to 10 mm. The tire 2 that includes the interposed portions 58 each having the width W1 that is not greater than 20 mm is lightweight, and can be obtained at low cost. Further, the tire 2 that includes the interposed portions 58 each having the width W1 that is not greater than 20 mm enables a ground contact shape to be advantageous. An advantageous ground contact shape contributes to abrasion resistance. In this viewpoint, the width W1 is particularly preferably not greater than 15 mm.

A width of each protruding portion 60 is indicated by an arrow W2 in FIG. 2. The width W2 is preferably greater than or equal to 10 mm, and preferably not greater than 20 mm. The protruding portions 60 each having the width W2 that is greater than or equal to 10 mm enable reduction of remaining air between the tread 4 and the carcass 12. In this viewpoint, the width W2 is particularly preferably greater than or equal to 13 mm. The tire 2 that includes the protruding portions 60 each having the width W2 that is not greater than 20 mm is lightweight, and can be obtained at low cost. Further, the tire 2 that includes the protruding portions 60 each having the width W2 that is not greater than 20 mm is excellent in durability. In this viewpoint, the width W2 is particularly preferably not greater than 17 mm.

FIG. 3 shows the adhesive sheet layer 28 which has not been subjected to a forming process. In the forming process, the adhesive sheet layers 28 are wound on the ends of the base layer 32 in the circumferential direction. The number of turns in winding is one.

A width W of each adhesive sheet layer 28 is preferably greater than or equal to 15 mm, and preferably not greater than 40 mm. The adhesive sheet layers 28 each having the width that is greater than or equal to 15 mm enable reduction of remaining air. In this viewpoint, the width W is particularly preferably greater than or equal to 20 mm. The tire 2 that includes the adhesive sheet layers 28 each having the width W that is not greater than 40 mm can be obtained at low cost. In this viewpoint, the width W is particularly preferably not greater than 35 mm.

A thickness T of each adhesive sheet layer 28 is preferably greater than or equal to 0.5 mm, and preferably not greater than 2.0 mm. The adhesive sheet layers 28 each having the thickness T that is greater than equal to 0.5 mm enable reduction of remaining air. In this viewpoint, the thickness T is particularly preferably greater than or equal to 1.0 mm. The tire 2 that includes the adhesive sheet layers 28 each having the thickness T that is not greater than 2.0 mm can be obtained at low cost. In this viewpoint, the thickness T is particularly preferably not greater than 1.5 mm.

When the tire 2 is manufactured, the inner layer 54 and the outer layer 56 of the belt 14 are wound on a drum of a former. The band 16 is wound over the belt 14. A ribbon-shaped rubber strip is supplied to the drum, and helically wound to be layered, thereby forming the base layer 32. The adhesive sheet layers 28 are wound near the ends of the base layer 32. A portion of each adhesive sheet layer 28 is wound on the base layer 32, and the remaining portion is wound on the drum. Another rubber strip is supplied to the former, and helically wound to be layered, thereby forming the cap layer 34. A portion of each adhesive sheet layer 28 is interposed between the base layer 32 and the cap layer 34. The belt 14, the band 16, the tread 4, and the adhesive sheet layers 28 are jointed to the carcass 12 that is formed in another stage. A portion, of each adhesive sheet layer 28, which is not interposed between the base layer 32 and the cap layer 34 is layered over and joined to the carcass 12.

In the present invention, the dimensions and angles of the components of the tire are measured in a state where the tire is mounted to a normal rim, and the tire is inflated with air to a normal internal pressure. During the measurement, no load is applied to the tire. In the description herein, the normal rim represents a rim that is specified according to the standard with which the tire complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. In the case of a tire for passenger cars, the dimensions and angles are measured in a state where an internal pressure is 180 kPa.

EXAMPLES

Hereinafter, effects of the present invention will become apparent according to examples. However, the present invention should not be restrictively construed based on the description of examples.

Example 1

A pneumatic tire shown in FIG. 1 was produced. The size of the tire was "235/45R18 94Y". The tire included the adhesive sheet layers. An index of an adhesive strength of the adhesive sheet layer was 140 when an adhesive strength of a cap layer of comparative example 2 described below was 100. In the adhesive sheet layers, the loss tangent tan δ was 0.30 and the complex elastic modulus E* was 10.5. The thickness T of the adhesive sheet layer was 0.5 mm. The width W1 of the interposed portion of each adhesive sheet layer was 5 mm, and the width W2 of the protruding portion thereof was 10 mm.

Comparative Example 1

A tire of comparative example 1 was obtained in the same manner as for example 1 except that no adhesive sheet layer was provided.

Example 2 to 4

Tires of example 2 to 4 were each obtained in the same manner as for example 1 except that the thickness T of the adhesive sheet layer was as indicated below in Table 1.

Example 5 to 9

Tires of example 5 to 9 were each obtained in the same manner as for example 1 except that the widths W1 and W2 were as indicated below in Table 2.

Example 10

A tire of example 10 was obtained in the same manner as for example 1 except that the thickness T and the widths W1 and W2 of the adhesive sheet layer were as indicated below in Table 3.

Example 11 to 12

Tires of example 11 to 12 were each obtained in the same manner as for example 1 except that a composition of the adhesive sheet layer was changed, and the adhesive strength thereof was as indicated below in Table 3.

Example 13

A tire of example 13 was obtained in the same manner as for example 1 except that a composition of the cap layer was changed and the complex elastic modulus E* of the cap layer was as indicated below in Table 3.

Comparative Example 2

A tire of comparative example 2 was obtained in the same manner as for example 1 except that a composition of the cap layer was changed and the loss tangent tan δ of the cap layer was as indicated below in Table 3, and no adhesive sheet layer was provided.

Fraction Defective 100 raw covers were produced. The raw covers were visually observed, and raw covers in which air remained near the ends of treads were determined as being defective. A fraction defective was calculated for each tire, and the tires were ranked according to the following criteria.
A: A fraction defective was less than or equal to 1%.
B: A fraction defective was greater than 1%, and less than or equal to 5%.
C: A fraction defective was greater than 5%.
The results are indicated below in Tables 1 to 3.

Ground Contact Shape

Each tire was mounted to a normal rim, and was inflated with air to an internal pressure of 230 kPa. A load of 4.2 kN was applied to the tire, and a ground contact shape was measured by using a static tester. The tires were ranked based on measurement results according to the following criteria.
- A: The ground contact shape was advantageous.
- B: The ground contact shape was slightly poor.
- C: The ground contact shape was poor.

The results are indicated below in Tables 1 to 3.

Durability

Each tire was mounted to a normal rim, and was inflated with air to an internal pressure of 230 kPa. The tire was mounted to a drum type tire testing machine, and a vertical load of 4.14 kN was applied to the tire. Running with the tire on a drum having a radius of 1.7 m at a speed of 80 km/h was performed. A running distance until the tire was broken was measured. The tires were ranked according to the measurement results. The results are indicated below in Tables 1 to 3.

Rolling Resistance

Each tire was mounted to a normal rim, and a rolling resistance was measured by using a rolling resistance tester under the following measurement conditions.
- Internal pressure: 230 kPa
- Load: 4.41 kN
- Speed: 80 km/h The tires were ranked based on the measurement results according to the following criteria.
- A: A rolling resistance was less than or equal to 110.
- B: A rolling resistance was greater than 110 and less than or equal to 114.
- C: A rolling resistance was greater than 114.

The results are indicated below in Tables 1 to 3.

Steering Stability

Each tire was mounted to a normal rim, and was inflated with air to an internal pressure of 230 kPa. The tire was mounted to a passenger car having an engine displacement of 4300 cc. A driver was caused to drive the passenger car on a racing circuit. The driver was caused to perform ranking based on the steering stability according to the following criteria.
- A: Steering stability was good.
- B: Steering stability was slightly bad.
- C: Steering stability was bad.

The results are indicated below in Tables 1 to 3.

TABLE 1

| | Evaluation results | | | | |
|---|---|---|---|---|---|
| | Comparative example 1 | Example 2 | Example 1 | Example 3 | Example 4 |
| Adhesive strength (index) | | | | | |
| Cap layer X | 80 | 80 | 80 | 80 | 80 |
| Base layer | 115 | 115 | 115 | 115 | 115 |
| Topping rubber of carcass | 110 | 110 | 110 | 110 | 110 |
| Adhesive sheet layer Y | — | 140 | 140 | 140 | 140 |
| Y/X | — | 1.75 | 1.75 | 1.75 | 1.75 |

TABLE 1-continued

| | Evaluation results | | | | |
|---|---|---|---|---|---|
| | Comparative example 1 | Example 2 | Example 1 | Example 3 | Example 4 |
| Cap layer | | | | | |
| Tanδ | 0.30 | 0.30 | 0.30 | 0.30 | 0.30 |
| E* | 10.5 | 10.5 | 10.5 | 10.5 | 10.5 |
| Adhesive sheet layer | | | | | |
| Thickness T (mm) | — | 0.1 | 0.5 | 2.0 | 2.5 |
| Width W (mm) | — | 15 | 15 | 15 | 15 |
| Width W1 (mm) of interposed portion | — | 5 | 5 | 5 | 5 |
| Width W2 (mm) of protruding portion | — | 10 | 10 | 10 | 10 |
| Mass of tire (kg) | 13.10 | 13.11 | 13.12 | 13.18 | 13.20 |
| Fraction defective | C | B | A | A | B |
| Ground contact shape | A | A | A | A | A |
| Durability | A | A | A | A | A |
| Rolling resistance | A | A | A | A | A |
| Steering stability | A | A | A | A | A |

TABLE 2

| | Evaluation results | | | | |
|---|---|---|---|---|---|
| | Example 5 | Example 6 | Example 7 | Example 8 | Example 9 |
| Adhesive strength (index) | | | | | |
| Cap layer X | 80 | 80 | 80 | 80 | 80 |
| Base layer | 115 | 115 | 115 | 115 | 115 |
| Topping rubber of carcass | 110 | 110 | 110 | 110 | 110 |
| Adhesive sheet layer Y | 140 | 140 | 140 | 140 | 140 |
| Y/X | 1.75 | 1.75 | 1.75 | 1.75 | 1.75 |
| Cap layer | | | | | |
| Tanδ | 0.30 | 0.30 | 0.30 | 0.30 | 0.30 |
| E* | 10.5 | 10.5 | 10.5 | 10.5 | 10.5 |
| Adhesive sheet layer | | | | | |
| Thickness T (mm) | 0.5 | 0.5 | 0.5 | 0.5 | 0.5 |
| Width W (mm) | 13 | 13 | 40 | 45 | 45 |
| Width W1 (mm) of interposed portion | 3 | 5 | 20 | 20 | 25 |
| Width W2 (mm) of protruding portion | 10 | 8 | 20 | 25 | 20 |
| Mass of tire (kg) | 13.11 | 13.11 | 13.15 | 13.25 | 13.25 |
| Fraction defective | B | B | A | A | A |
| Ground contact shape | A | A | A | A | B |
| Durability | A | A | A | B | A |
| Rolling resistance | A | A | A | B | B |
| Steering stability | A | A | A | A | A |

TABLE 3

| | Evaluation results | | | | |
|---|---|---|---|---|---|
| | Example 10 | Example 11 | Example 12 | Example 13 | Comparative example 2 |
| Adhesive strength (index) | | | | | |
| Cap layer X | 80 | 80 | 80 | 80 | 100 |
| Base layer | 115 | 115 | 115 | 115 | 115 |
| Topping rubber of carcass | 110 | 110 | 110 | 110 | 110 |

TABLE 3-continued

Evaluation results

| | Example 10 | Example 11 | Example 12 | Example 13 | Comparative example 2 |
|---|---|---|---|---|---|
| Adhesive sheet layer Y | 140 | 104 | 120 | 140 | 140 |
| Y/X | 1.75 | 1.30 | 1.50 | 1.75 | 1.75 |
| Cap layer | | | | | |
| Tanδ | 0.30 | 0.30 | 0.30 | 0.30 | 0.35 |
| E* | 10.5 | 10.5 | 10.5 | 10.0 | 10.5 |
| Adhesive sheet layer | | | | | |
| Thickness T (mm) | 2.0 | 0.5 | 0.5 | 0.5 | — |
| Width W (mm) | 40 | 15 | 15 | 15 | — |
| Width W1 (mm) of interposed portion | 20 | 5 | 5 | 5 | — |
| Width W2 (mm) of protruding portion | 20 | 10 | 10 | 10 | — |
| Mass of tire (kg) | 13.20 | 13.12 | 13.12 | 13.12 | 13.10 |
| Fraction defective | A | B | A | A | B |
| Ground contact shape | A | A | A | A | A |
| Durability | A | A | A | A | A |
| Rolling resistance | A | A | A | A | C |
| Steering stability | A | A | A | B | A |

As indicated in Tables 1 to 3, the tire of each example is excellent in various performances. The evaluation results clearly indicate that the present invention is superior.

INDUSTRIAL APPLICABILITY

The pneumatic tire according to the present invention can be mounted to various vehicles.

DESCRIPTION OF THE REFERENCE CHARACTERS

2 ... tire
4 ... tread
6 ... sidewall
8 ... clinch portion
10 ... bead
12 ... carcass
14 ... belt
16 ... band
18 ... edge band
20 ... inner liner
22 ... insulation
24 ... cushion layer
26 ... chafer
28 ... adhesive sheet layer
32 ... base layer
34 ... cap layer
58 ... interposed portion
60 ... protruding portion

The invention claimed is:

1. A pneumatic tire comprising:
a tread including a base layer, and a cap layer that is disposed outward of the base layer in a radial direction and is layered over the base layer;
a pair of sidewalls that extend inward from ends, respectively, of the tread in the radial direction;
a pair of beads that are disposed inward of the sidewalls, respectively, in the radial direction;
a carcass that is extended, along the tread and the sidewalls, on and between both the beads;
a pair of adhesive sheet layers disposed such that a portion of each adhesive sheet layer is interposed between the base layer and the cap layer, and a remaining portion of each adhesive sheet layer is layered over the carcass in a region inward of each sidewall in an axial direction; and
a belt disposed outward of the carcass in the radial direction,
wherein, in an axial direction, an inner end of each adhesive sheet layer is disposed outwardly of the corresponding end of the belt,
wherein a thickness of each adhesive sheet layer is greater than or equal to 0.5 mm, and not greater than 2.0 mm, and
wherein each adhesive sheet layer has a constant thickness.

2. The tire according to claim 1, wherein a width of the portion of each adhesive sheet layer interposed between the base layer and the cap layer is greater than or equal to 5 mm, and not greater than 20 mm.

3. The tire according to claim 1, wherein a width of the portion of each adhesive sheet layer which is layered over the carcass is greater than or equal to 10 mm, and not greater than 20 mm.

4. The tire according to claim 1, wherein a ratio of an adhesive strength of each adhesive sheet layer to an adhesive strength of the cap layer is greater than or equal to 1.30.

5. The tire according to claim 4, wherein the ratio of an adhesive strength of each adhesive sheet layer to an adhesive strength of the cap layer is greater than or equal to 1.50.

6. The tire according to claim 1, wherein, in a measurement under conditions that an initial strain is 10%, a dynamic strain is ±2%, a frequency is 10 Hz, a deformation mode is tension, and a temperature is 30° C., a loss tangent tan δ is less than or equal to 0.30, and a complex elastic modulus E* is greater than or equal to 10.5 in the cap layer.

7. The tire according to claim 1, wherein a rubber composition of the adhesive sheet layers contains a tackifier.

8. The tire according to claim 7, wherein an amount of the tackifier with respect to 100 parts by mass of a base rubber of the adhesive sheet layer is greater than or equal to 5 parts by mass.

9. A pneumatic tire comprising:
a tread including a base layer, and a cap layer that is disposed outward of the base layer in a radial direction and is layered over the base layer;
a pair of sidewalls that extend radially inward from opposite ends of the tread;
a pair of beads that are disposed radially inward of the sidewalls;
a carcass extending along the tread and the sidewalls, on and between both the beads;
a belt between the carcass and cap layer of the tread, the belt having a first edge and a second edge spaced from the first edge in an axial direction; and
a pair of adhesive sheet layers, each adhesive sheet layer having a first portion disposed between the base layer and the cap layer, and a second portion over the carcass in each sidewall,
wherein each adhesive sheet layer is spaced from the belt in a direction extending from an equator of the tire to one of the beads so that the adhesive sheet layers do not overlap the belt,
wherein an interposed portion of each adhesive sheet layer is between the base layer and the cap layer, and a remaining portion of each adhesive sheet layer is layered over the carcass in a region inward of each sidewall in an axial direction, and wherein a width of the remaining portion is equal to or greater than a width of the interposed portion.

10. The tire according to claim 9, wherein each adhesive sheet layer has a constant thickness.

11. The tire according to claim 9, wherein each adhesive sheet has a first end and a second end, a distance from the first end to the second end defining a width of each adhesive sheet,
   wherein each adhesive sheet has a bottom surface contacting the base layer and the carcass in each sidewall and a top surface contacting the cap layer, a distance between the bottom surface and top surface defining a thickness of each adhesive sheet, and
   wherein the width of each adhesive sheet is greater than the thickness of each adhesive sheet.

12. The tire according to claim 9, wherein the width of the remaining portion is greater than or equal to 10 mm, and not greater than 20 mm.

13. The tire according to claim 12, wherein the width of adhesive sheet is 40 mm, the width of the remaining portion is 20 mm and the width of the interposed portion is 20 mm.

\* \* \* \* \*